(12) United States Patent
Kim

(10) Patent No.: US 7,305,686 B2
(45) Date of Patent: Dec. 4, 2007

(54) OPTICAL DISK PLAYER

(75) Inventor: Han-Kyung Kim, Kyungki-do (KR)

(73) Assignee: KMC Co, Ltd. (KR)

( * ) Notice: Subject to any disclaimer, the term of this patent is extended or adjusted under 35 U.S.C. 154(b) by 91 days.

(21) Appl. No.: 11/217,264

(22) Filed: Aug. 31, 2005

(65) Prior Publication Data

US 2006/0095930 A1    May 4, 2006

(30) Foreign Application Priority Data

Oct. 30, 2004    (KR) .................... 10-2004-0087571

(51) Int. Cl.
*G11B 17/022*    (2006.01)
(52) U.S. Cl. .................................... 720/626
(58) Field of Classification Search ................ 720/626, 720/645, 623; 369/271, 77.11, 77.21
See application file for complete search history.

(56) References Cited

U.S. PATENT DOCUMENTS

| 5,097,460 A |   | 3/1992 | Camps et al. |
|---|---|---|---|
| 5,416,763 A |   | 5/1995 | Ohsaki |
| 6,880,160 B1 | * | 4/2005 | Lee et al. .................. 720/623 |
| 7,140,030 B2 | * | 11/2006 | Togawa ..................... 720/623 |
| 2001/0021158 A1 | * | 9/2001 | Sanada et al. ............. 369/77.2 |
| 2002/0015374 A1 | * | 2/2002 | Abe ........................... 369/77.1 |
| 2002/0067687 A1 | * | 6/2002 | Kato .......................... 369/271 |

FOREIGN PATENT DOCUMENTS

| KR | 100175082 B1 | 11/1998 |
|---|---|---|
| KR | 1020030094927 A | 12/2003 |
| KR | 20-0339946 | 1/2004 |
| WO | WO2004/049325 A1 | 6/2004 |

* cited by examiner

*Primary Examiner*—Tianjie Chen
(74) *Attorney, Agent, or Firm*—Akerman Senterfitt

(57) ABSTRACT

An optical disc player includes a disc determining device for determined the size of an optical disc loaded into the optical disc player, a disc chucking device for the optical disc loaded into the optical disc player, and a disc chucking lever device for associating the disc determining device with the disc chucking device. The disc determining device is guided to the chucking position by the pins and members for locking the pins and positions of the pins for driving the chucking device are changed according to the size of the optical disc so that the optical disc player can be slim. Since the chucking plate, the chucking plate holder, and the plate springs of the disc chucking device for horizontally chucking the optical disc inserted into the optical disc player are thin, the optical disc player can be slim.

10 Claims, 12 Drawing Sheets

OPTICAL DISK PLAYER

BACKGROUND OF THE INVENTION

1. Field of the Invention

The present invention relates to an optical disc player, and more particularly, to an optical disc player including a disc determining device for selectively determining the size (8 cm or 12 cm) of an optical disc loaded therein, a disc chucking device for chucking the optical disc, loaded in the optical disc player, in the horizontal direction, and a disc chucking lever for driving the disc determining device to be associated with the disc chucking device, performing stable determination and chucking of the optical disc, and enabling the optical disc player to be thin.

2. Description of the Related Art

Generally, an optical disc player includes a disc determining device for automatically determining types of recoding media, in which information is recorded by the same method, and which are categorized into an 8 cm disc and a 12 cm disc according to their sizes and reproducing the determined recoding media, and a disc chucking device for chucking (clamping) the optical disc loaded into to the optical disc player by a disc loading device.

The conventional optical disc player structured as described above will be described with reference to the accompanying drawings as follows.

FIG. 1 is a perspective view illustrating a disc determining device of a conventional optical disc player, FIG. 2 is a side sectional view illustrating a disc chucking device of the conventional optical disc player, and FIG. 3 is a side sectional view illustrating operation of the disc chucking device of the conventional optical disc player.

Firstly, as shown in FIG. 1, the conventional optical disc player 100 includes a main substrate 101 installed at the lower side of the conventional optical disc player 100, an auxiliary substrate 102 installed at the upper side of the conventional optical disc player 100, light emitting parts 104 and 105 installed at different positions on the main substrate 101, and light receiving parts 106 and 107 installed on the main substrate 101 to correspond to the light emitting parts 104 and 105.

Signals transmitted from the light emitting parts 104 and 105 are interrupted by an inserted optical disc and the light receiving parts 106 and 107 cannot receive the signals so that the insertion of the optical disc is detected and the size of the optical disc is also detected. Thus, the loading of a recoding medium is initiated and the size of the recording medium is determined.

In the recording medium detection method as described above, when the optical disc as a recoding medium is inserted into the conventional optical disc player, the insertion of the optical disc is detected by whether the light receiving parts receive the light beams transmitted from the light emitting parts or not. When all the light beams, to be received by the two light receiving parts, are interrupted by the optical disc, the inserted optical disc is determined to be a general size optical disc, that is, a 12 cm optical disc. Meanwhile, when the light beam transmitted from the outer light emitting part is not received by the light receiving parts, the optical disc is determined to be a compact recording medium, that is, an 8 cm recording medium.

As shown in FIGS. 2 and 3, the disc chucking device of the conventional optical disc player 100 includes a turntable 300 coupled with a rotation shaft 210 of a spindle motor 200, a clamp 400 coupled with the upper end of the turntable 300, a plate spring 500 for elastically supporting the clamp 400, an electromagnet 600 for pulling the clamp 400 using the electromagnetic force and coupling the clamp 400 to the turntable 300, and a clamp controller 700 for controlling the electromagnet 600.

The lower side of the turntable 300 is coupled with a rotation shaft 341 of a spindle motor 340, installed on an electric circuit board 320, and a disc loading part 360, on which an optical disc D is loaded, is formed in the upper side of the turntable 300. The clamp 400 has a coupling groove formed in the lower side thereof and coupled with the disc loading part 360 of the turntable 300 to chuck the optical disc D loaded on the disc loading part 360, is made of steel, and is upwardly spaced apart from the disc loading part 360 of the turntable 300 by a predetermined distance due to a plate spring 500.

The plate spring 500 provides elastic force to the clamp 400 such that the clamp 400 is upwardly spaced apart from the disc loading part 360 by the predetermined distance, and has an end fixed to a support plate 520 by a bolt B and the other end rotatably coupled with the upper end of the clamp 400 by a rotation connecting member 540.

The electromagnet 600 is installed around the rotation shaft 341 of the spindle motor 340, and pulls the clamp 400 using magnetic force generated due to electric power supplied from the clamp controller 700 and couples the clamp 400 to the disc loading part 360 of the turntable 300. The electromagnet 600 includes a cylindrical iron core 610, fitted around a cylindrical coupling protrusion 342 protruded from the upper side of a body of the spindle motor 340, and a coil 620 wound around the outer circumference of the iron core 610. Thus, the electromagnet 600 generates a uniform magnetic field about the rotation shaft 341 of the spindle motor 340 so that the clamp 400 closely contacts the disc loading part 360 of the turntable 300, and the iron core 610 is strongly magnetized by the magnetic field generated by the coil 620 so that the magnetic field of the electromagnet 600 becomes stronger.

The iron core 610 has separation preventing grooves 611 formed in the inner circumference thereof, and separation preventing steps 343 formed in the upper outer circumference of the coupling protrusion 342 are inserted into the separation grooves 611. The clamp controller 700 controls the electromagnet 600 by supplying electric power to the electromagnet 600 so that the disc loading part 360 of the turntable 300 is coupled with or separated from the clamp 400.

However, as shown in FIG. 1, when the optical disc is inserted into or ejected from the optical disc player, since inserting time, ejecting position, and reinsertion of the optical disc are not effectively performed, manufacturing costs are increased and workability is inferior.

Meanwhile, as shown in FIGS. 2 and 3, according to the chucking device of the optical disc player, since the chuck is elastically supported by the plate spring to chuck the optical disc, a sufficient space for vertical movement of the chuck is required. Thus, a thin optical disc player cannot be manufactured.

SUMMARY OF THE INVENTION

Therefore, the present invention has been made in view of the above and/or other problems, and it is an object of the present invention to provide an optical disc player including a disc determining device capable of determining the optical disc size using a simple mechanism and manufactured in a slim size.

In accordance with the present invention, the above and other aspects can be accomplished by the provision of an optical disc player including a disc determining device for determining the size of an optical disc loaded into the optical disc player, a disc chucking device for chucking the optical disc loaded into the optical disc player, and a disc chucking lever device for associating the disc determining device with the disc chucking device.

Preferably, the disc determining device includes a pair of linear guide holes symmetrically formed in the central region of an upper case, horizontally movable levers movably inserted into the linear guide holes by first pins and having linear gears engaged with gears of a rotation plate, a locking member disposed in the region of the horizontally movable levers of the front side of the upper case to lock the first pins of the horizontally movable levers in the linear guide holes, and a pivoting lever connected to one of the horizontally movable levers by a connection linkage, and having a second pin contacting the optical disc when the optical disc is positioned at the chucking position and driving the disc chucking lever device when the second pin is positioned at a proper position by the optical disc.

The disc chucking device includes a chucking plate holder rotatably connected to the upper case and having a pair of blades connected to the disc chucking lever device, a plurality of plate springs disposed to the chucking plate holder, introduction grooves formed in the inner circumference of an opening formed in the central region of the upper case, and having upwardly curved protrusions integrally and upwardly formed with the inner sides of an opening introducing grooves, and locking protrusions formed in the other sides of the introducing grooves and spaced apart from the upwardly curved protrusions by a predetermined distance, wherein the plate springs are selectively introduced therein when the optical disc is chucked or released, and a chucking plate accommodated on the upper sides of the plate springs to be elastically pressed upward.

The disc chucking lever device includes a chucking lever including first and second levers connected to blades of the chucking plate holder and respectively installed to the sides of the upper case to move in opposite directions, a movable member including a guide locking hole connected to the other end of a pivoting lever by a connection pin and a rack gear formed in the inner side of the guide locking hole, and movably seated on the upper side end of the upper case at the same level as that of the first lever, and a power transmitting member installed to the lower side of the upper case and including a pinion gear engaged with the rack gear, and a loading motor for rotating the pinion gear.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

Figure 1:
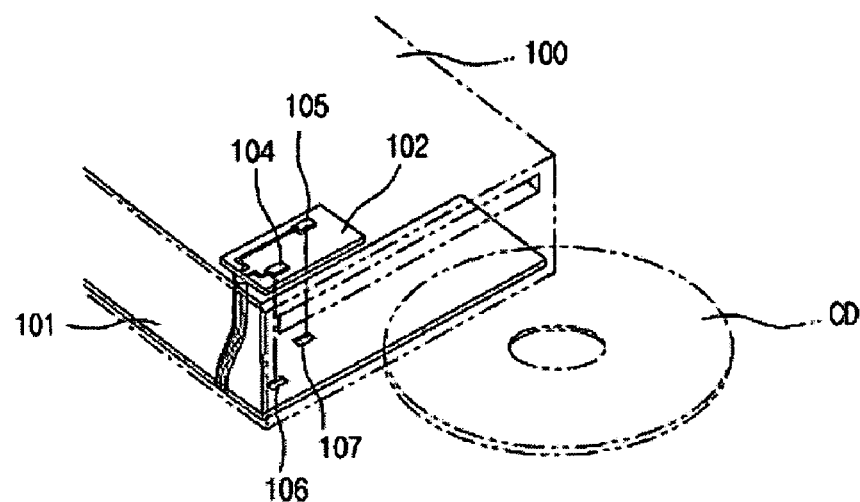
FIG. 1 is a perspective view illustrating a disc determining device of a conventional optical disc player.
Figure 2:
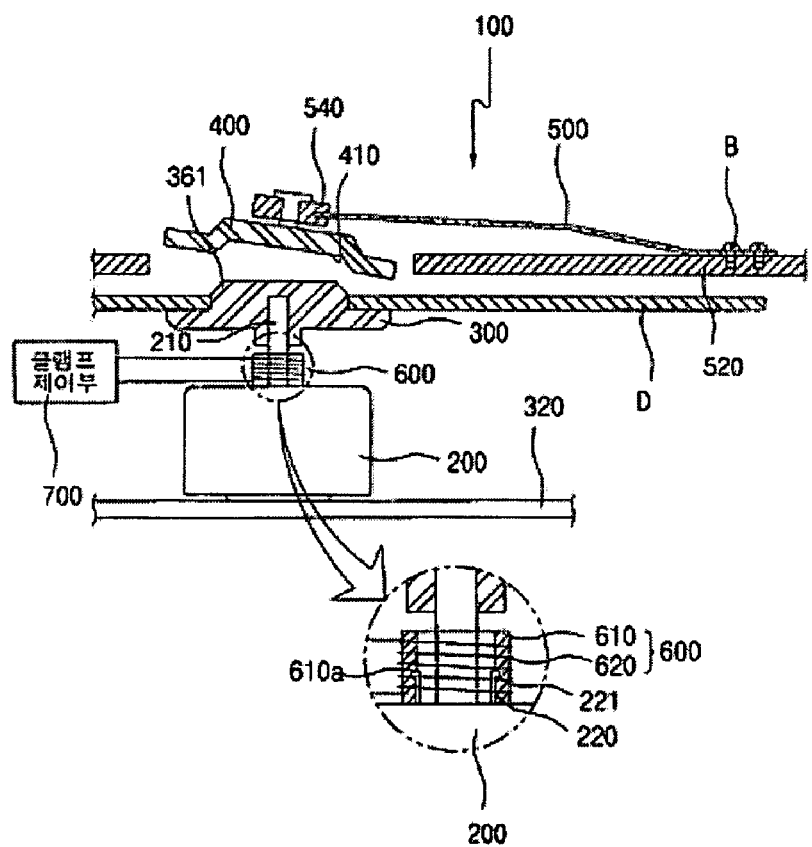
FIG. 2 is a side sectional view illustrating a disc chucking device of the conventional optical disc player.
Figure 3:
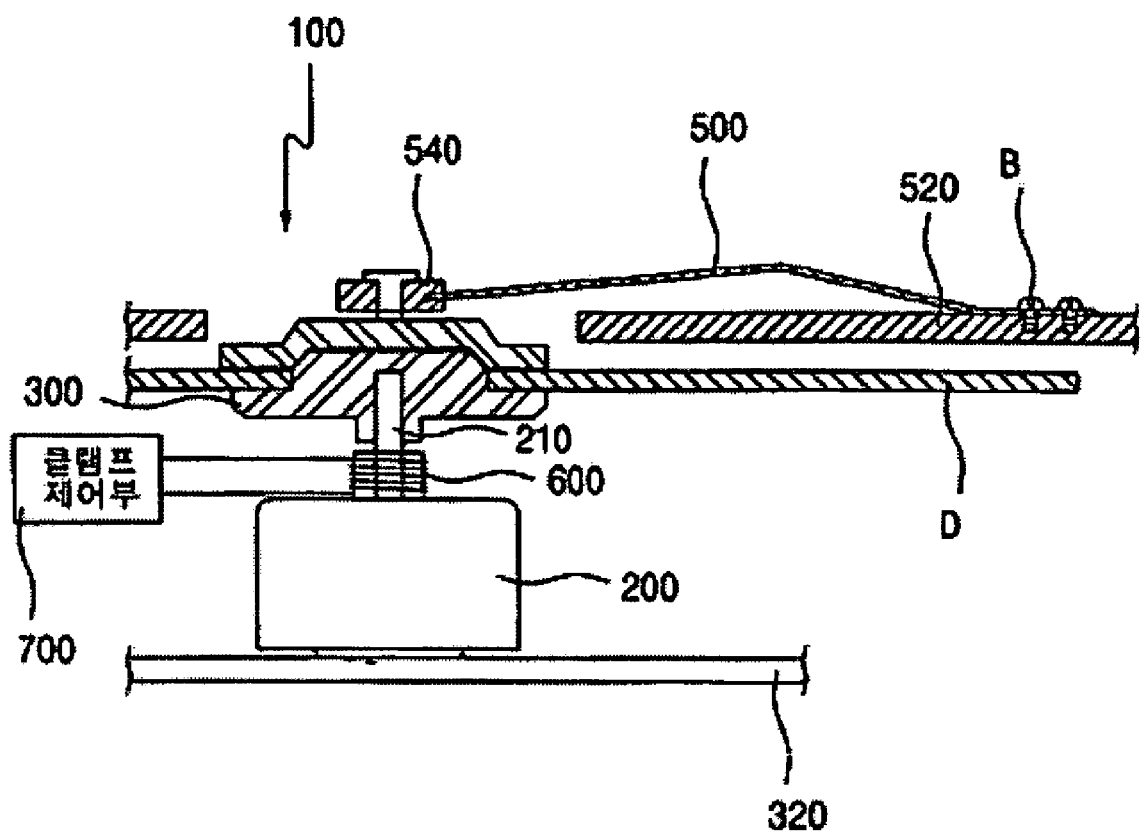
FIG. 3 is a side sectional view illustrating operation of the disc chucking device of the conventional optical disc player.
Figure 4:
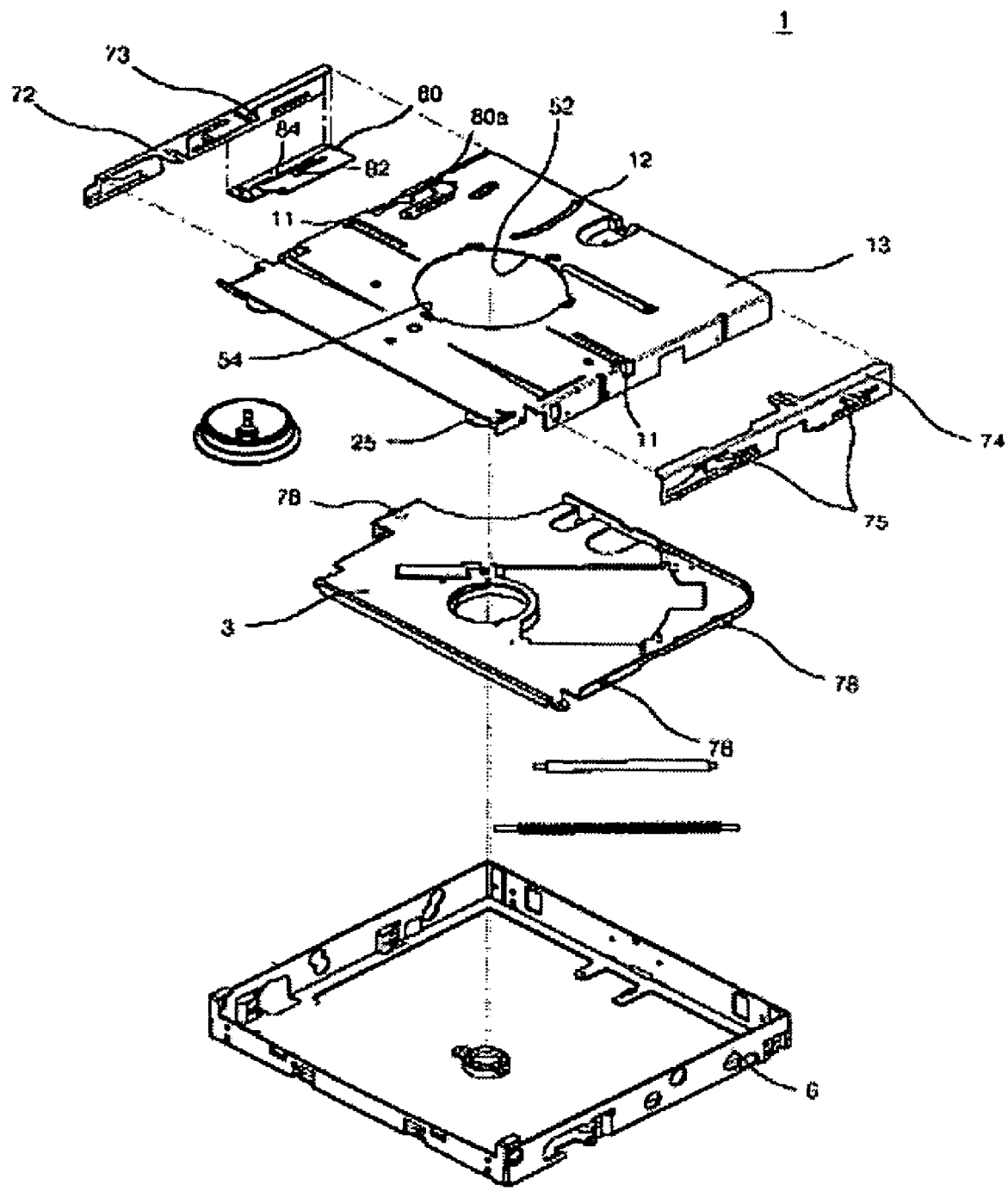
FIG. 4 is an exploded perspective view illustrating the structure of an optical disc player according to a preferred embodiment of the present invention.
Figure 5:
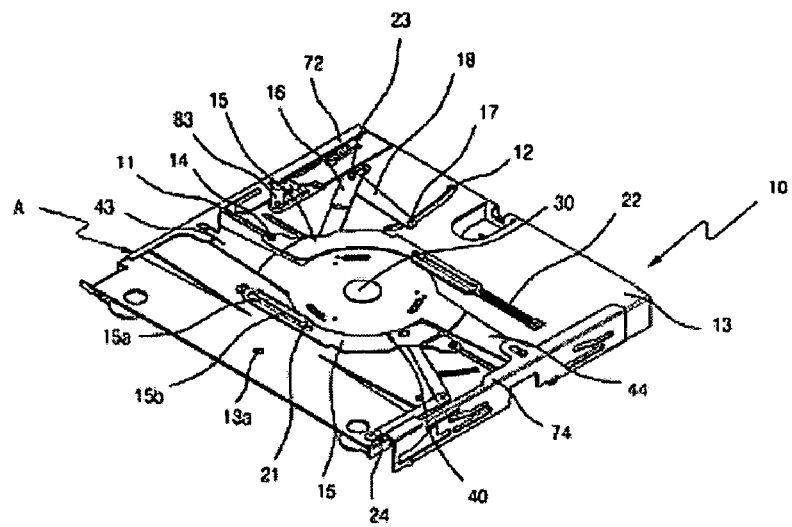
FIG. 5 is a perspective view illustrating assembly of the optical disc player in FIG. 5.
Figure 6:
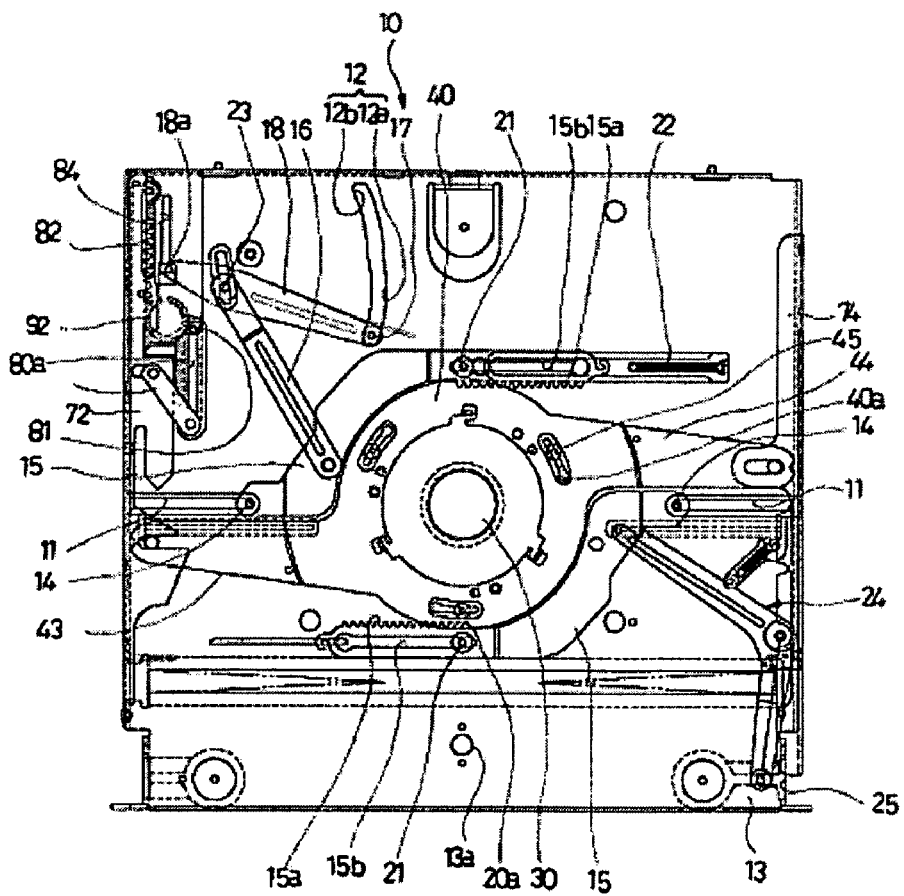
FIG. 6 is a plan view of the optical disc player in FIG. 5.
Figure 7:
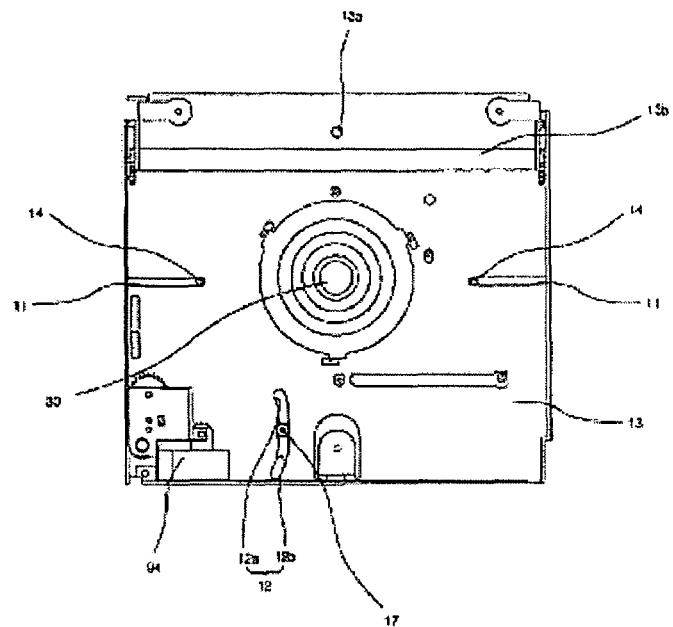
FIG. 7 is a bottom view illustrating the optical disc player according to the preferred embodiment in which a pickup is removed.
Figure 8:
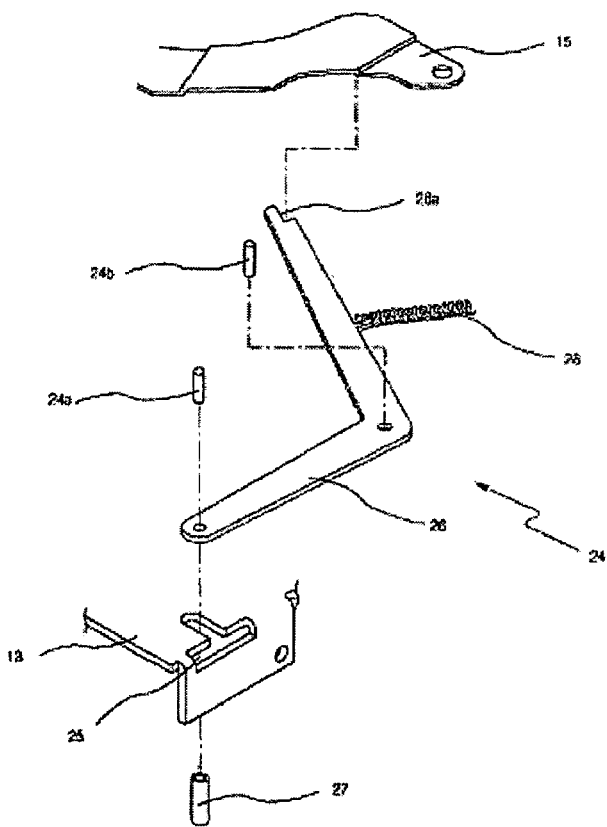
FIG. 8 is an exploded perspective view illustrating a locking member of the optical disc player according to the preferred embodiment of the present invention.

Hereinafter, the preferred embodiment of the present invention will be described in detail with reference to the accompanying drawings.

As shown in FIGS. 4 to 7, an optical disc player 1 according to a preferred embodiment of the present invention includes a disc determining device 10, a disc chucking device 50, and a disc chucking lever device A.

The disc determining device 10, as shown in FIGS. 4 to 10, includes an upper case 3, a pair of horizontally movable levers 15, and a pivoting lever 18. The upper case 13 includes a chucking plate 30 disposed at the central region thereof, a pair of linear guide holes 11 extended from the right and left sides of the chucking plate 30, and an arc-shaped guide hole 12 formed at the rear region of the upper case 13 and having first and second arc-shaped hole 12a and 12b. The horizontally movable levers 15 are symmetrically arranged about the chucking plate 30 and respectively include first pins 14 inserted into the linear guide holes 11. The pivoting lever 18 is connected to one of the horizontally movable levers 15 by a connection linkage 16 and includes a second pin 17 inserted into the arc-shaped guide hole 12.

The upper case 13 has a sensor hole 13a formed in the front side thereof. In the sensor hole 13a, a photo-sensor (not shown) for detecting an optical disc, inserted into the optical disc player 1 according to the preferred embodiment of the present invention, is installed.

In the front side of the upper case 13, a roller 13b is positioned. The roller 13b inserts the optical disc into the optical disc player by the movement of the disc chucking lever device A due to a signal from the photo-sensor when the optical disc is detected by the photo-sensor (not shown).

Meanwhile, a pickup case 3, in which a pickup (not shown) is installed, is disposed to the lower side of the upper case 13 and installed in a main frame 6.

The linear guide holes 11 are symmetrically formed at the right and left sides of the central region of the upper case 13, and a pair of the first pins 14 of the horizontally movable levers 15 are inserted into the liner guide holes 11 and move right and left.

The distance between the linear guide holes 11 is sufficient for an 8 cm optical disc CD1 and a 12 cm optical disc CD2 to pass through the linear guide holes 11. In other words, when the first pins 14 of the horizontally movable levers 15 are respectively positioned in the linear guide holes 11, the 8 cm optical disc CD1 passes between the liner guide holes 11, and when the first pins 14 of the horizontally movable levers 15 are respectively positioned at the outside of the linear guide holes 11, the 12 cm optical disc CD2 passes between the linear guide holes 11

Meanwhile, at the front side of the upper case 13 and in a region where the horizontally movable levers 15 move, a locking member 24 is installed such that the first pins 14 of the horizontally movable levers 15 are respectively positioned and locked in the linear guide hole 11.

The locking member 24 includes a locking and moving hole 25, a rotating piece 26, a rotation roller 27, and an elastic member 28. The locking and moving hole 25 is formed in the front side of the upper case 13. The rotating piece 26 has an end movably inserted into the locking and moving hole 25 by a fixing pin 24a, a central region rotatably connected to the upper case 13 by a rotation pin 24b, and the other end having a locking step 26a to which the lower sides of the horizontally movable levers 15 we locked. The rotation roller 27 is rotatably hung around the outer circumference of the fixing pin 24a to contact the 12 cm optical disc CD2 and to rotate the rotating piece 26 without interference when the 12 cm optical disc CD2 passes therethrough. The elastic member 28 is disposed between the other end of the rotating piece 26 and the upper case 13 to support the rotating piece 26.

The locking member 24 does not operate during the insertion of the 8 cm optical disc CD1, in other words, the horizontally movable levers 15 do not move so that the 8 cm optical disc CD1 passes between the first pins 14 and is mated with the chucking plate 30, the 12 cm optical disc CD2 is locked by the rotation roller 27 of the locking member 24 so that the fixing pin 25a disposed at the side of the rotating piece 26 moves along the locking and moving hole 25 to the right side, whereby the locking step 26a of the other side of the rotating piece 26 rotates counterclockwise about the rotation pin 24b and the locking step 26a is separated from the lower sides of the horizontally movable levers 15 so that the horizontally movable levers 15 move right and left.

Meanwhile, each of the horizontally movable levers 15 includes a linear gear 15a formed in the inner side thereof and engaged with a gear 20a formed in the outer circumference of a rotation plate 20 (See FIG. 11), and a linear guide hole 15b formed adjacent to the linear gear 15a. Pin members 21 disposed in the upper case 13 are guided along the guide holes 15b such that jamming of the horizontally movable levers 15, generated when the horizontally movable levers 15 move right and left, is prevented, so that the horizontally movable levers 15 precisely move.

The horizontally movable levers 15 are respectively connected to tension springs 22, and the linear gears 15a of the horizontally movable levers 15 are engaged with the gears 20a of the rotation plate 20 due to elastic force of the tension springs 22.

Meanwhile, the rotation plate 20 whose gears 20a are engaged with the linear gears 15a of the horizontally movable levers 15, is rotatably connected to the lower inner circumference of a chucking plate holder 40 by pin members 45 installed to the chucking plate holder 40 and the upper case 13. The chucking plate holder 40 has rotation guide holes 40a rotated along the pin members 45.

The pivoting lever 18 is installed such that an end thereof is positioned in the duplicate arc-shaped guide hole 12 by a second pin 17. The movement of the horizontally movable levers 15 is transmitted to the pivoting lever 18 via the connection linkage 16 when the horizontally movable levers 15 move, and the other end of the pivoting lever 18 drives the disc chucking lever device A through a connection pin 18a.

The arc-shaped guide hole 12 has a first arc-shaped hole 12a formed such that the 8 cm optical disc CD1 contacts the second pin 17 when the 8 cm optical disc CD1 is positioned at the chucking position, and a second arc-shaped hole 12b formed such that the 12 cm optical disc CD2 contacts the second pin 17 when the 12 cm optical disc CD2 is positioned at the chucking position.

The pivoting lever 18 is installed to the upper case 13 and rotates about a connection position 23 positioned in the arc-shaped guide hole 12, and the other end of the pivoting lever 18 is connected to the disc chucking lever device A by the connection pin 18a.

Figure 11:
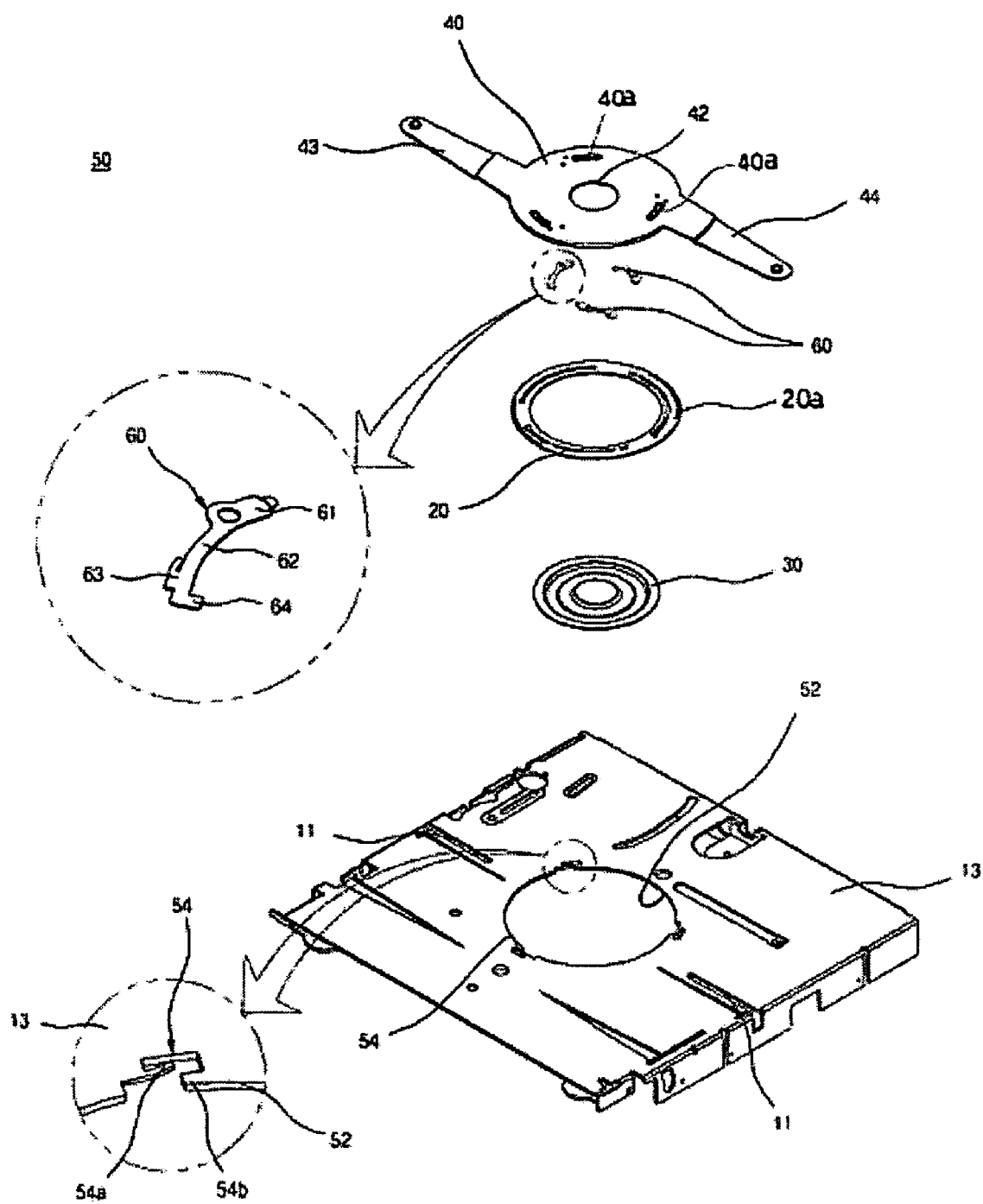
FIG. 11 is an exploded perspective view illustrating main parts of the disc chucking device of the optical disc player according to the preferred embodiment of the present invention.
Figure 12:
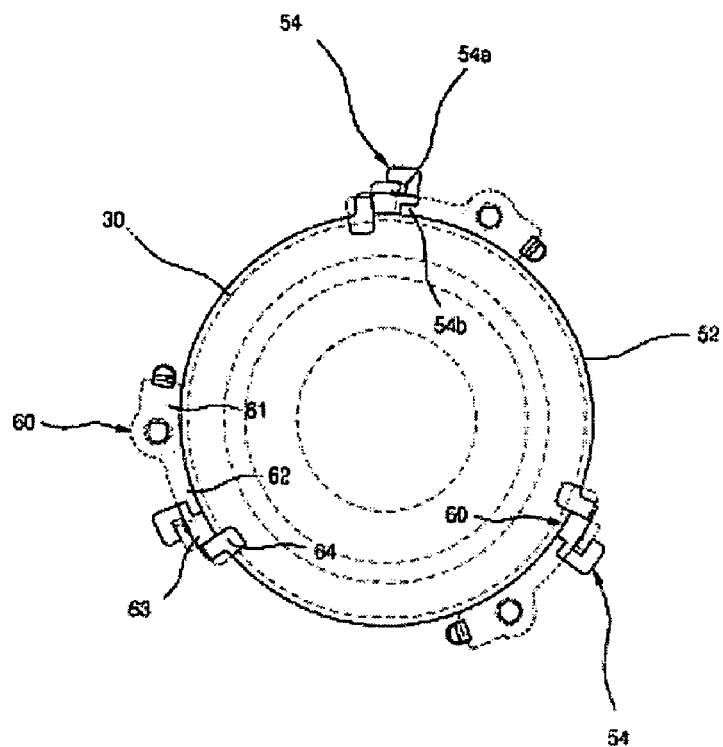
FIG. 12 is a plan view illustrating assembly of the disc chucking device of the optical disc player according to the preferred embodiment of the present invention.
Figure 13A:
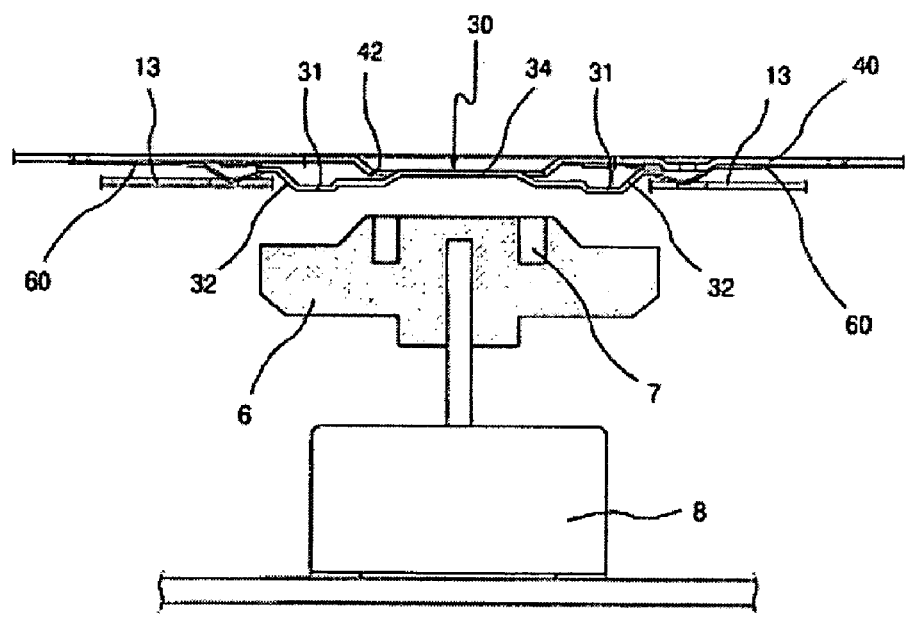
FIG. 13a is a sectional view illustrating the no-disc state of the disc chucking device of the optical disc player according to the preferred embodiment of the present invention.
Figure 13B:
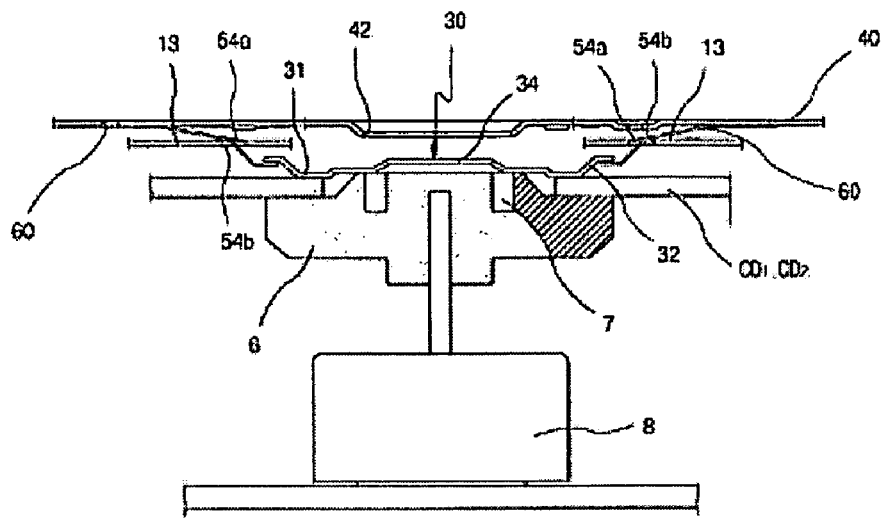
FIG. 13b is a sectional view schematically illustrating the chucked state of an optical disc by the disc chucking device of the optical disc player according to the preferred embodiment of the present invention.
Figure 14:
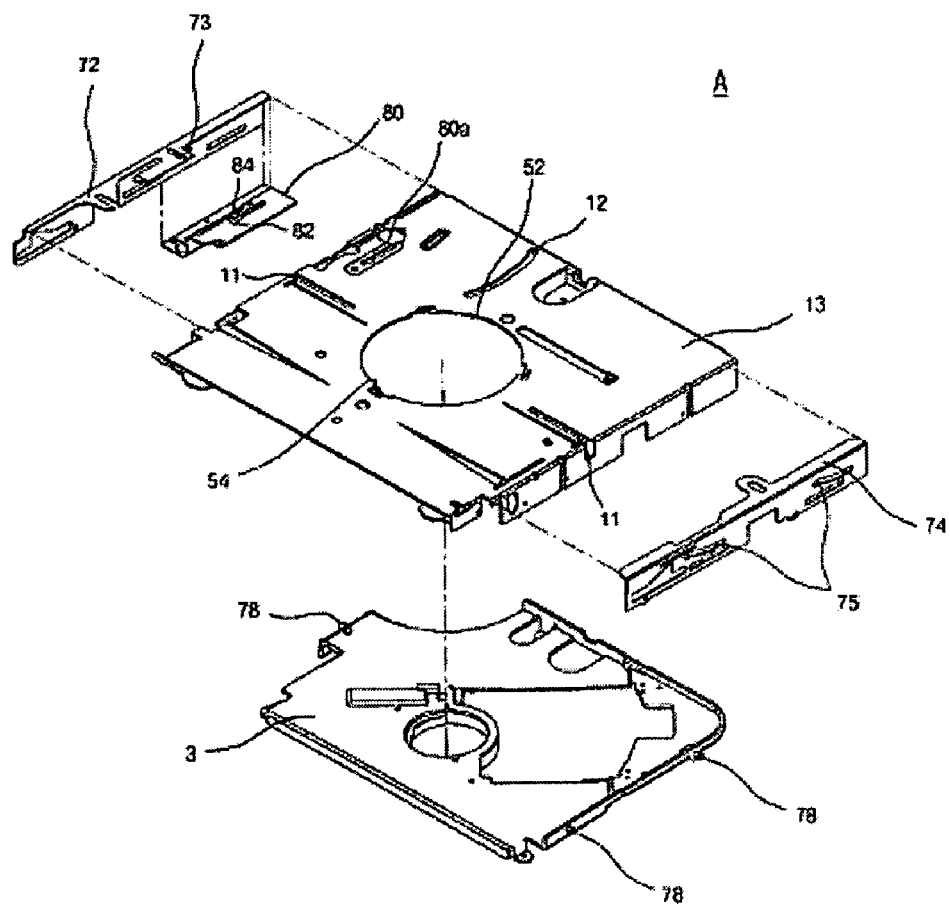
FIG. 14 is an exploded perspective view illustrating main parts of a driving device of the disc determining device and the disc chucking device of the optical disc player according to the preferred embodiment of the present invention.
Figure 15:
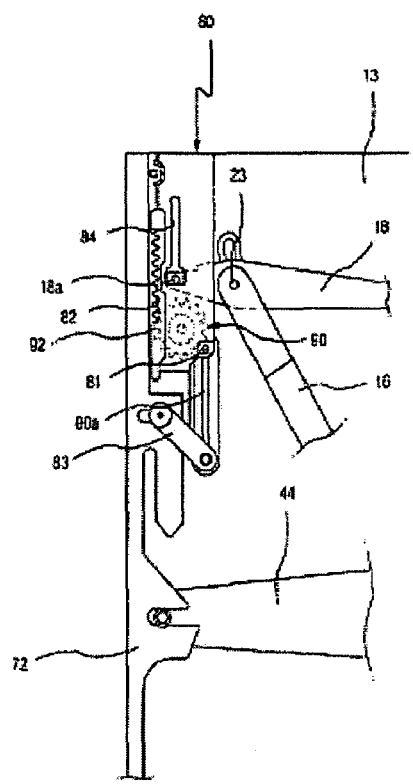
FIG. 15 is a plan view illustrating main parts of the driving device of the disc determining device and the disc chucking device of the optical disc player according to the preferred embodiment of the present invention.

Meanwhile, as shown in FIGS. 11 to 13, the disc chucking device 50 includes a circular opening 52 formed in the central region of the upper case 13, a plurality of introducing grooves 54 formed in the inner circumference of the opening 52, and the chucking plate holder 40 having plate springs 60 having leading ends inserted into the introducing grooves 54 and installed to the lower side of the chucking plate holder 40.

The chucking plate 30 is manufactured in the form of a disc having several indentations, and includes an outer circumference to which elastic force of the plural plate springs 60 are applied, a chucking part 31 positioned in the outer circumference 32 and protruded above the plate springs 60 to contact the upper side of the optical disc when the optical disc is pulled by a magnet 7 installed on the turntable 6, in other words, when chucking the optical disc, and a central protrusion 34 accommodated in an accommodating hole 42 formed in the central region of the chucking plate holder 40 by the elastic force of the plate springs 60 when the optical disc is not chucked.

The chucking plate holder 40 is connected to the disc chucking lever device A disposed at the optical disc player such that blades 43 and 44 formed at the lateral sides thereof are connected to the disc chucking lever device A, and rotated forward and backward by the disc chucking lever device A.

The introduction grooves 54 have upwardly curved protrusions 54a integrally and upwardly formed with the inner sides of the introducing grooves 54, and locking protrusions 54b spaced apart from the upwardly curved protrusions 54a by a predetermined distance.

The number of the plate springs 60 is identical to the number of the introducing grooves 54 and the plate springs 60 are installed to the lower side of the chucking plate holder 40. Each of the plate springs 60 includes a fixing part 61 fixed to the lower side of the chucking plate holder 40, a connector 62 integrally formed with the fixing part 61, an elastic part 63 integrally formed with the connector 62 at an angle and inserted into one of the upper curvature protrusions 54a and one of the locking protrusions 54b of the introducing groove 54, and a seating part 64, integrally formed with the elastic part 63, on which the chucking plate 30 is seated.

Meanwhile, as shown in FIGS. 14 to 17, the disc chucking lever device A includes a chucking lever 70, a movable member 80, and a power transmitting member 90.

The chucking lever 70 includes first and second levers 72 and 74, which are connected to the blades 43 and 44 of the chucking plate holder 40 and respectively installed to the sides of the upper case to move oppositely.

The first and second levers 72 and 74 respectively have distance maintaining slots 73 and 75 formed in the central region and the sides thereof in an angled, step-shaped form, and movable pins 78 protruded from the ends of the pickup case 3 are respectively inserted into the distance maintaining slots 73 and 75 so that the distance maintaining slots 73 and 75 move along the movable pins 78 forward and rearward.

The distance maintaining slots 73 and 75 have upper and lower horizontally seating parts 73a, 73b, 75a, and 75b to which the movable pins 78 are locked, and slopes 73c and 75c for connecting the upper and lower horizontally seating parts 73a, 73b, 75a, and 75b.

The movable member 80 is movably seated on the upper side end of the upper case 13 and includes a guide locking hole 82 connected to the other end of the pivoting lever 18 by the connection pin 18a and a rack gear 84 formed in the inner side of the guide locking hole 82.

The movable member 80 is seated on the upper case 13 at the same level as that of the first lever 72 in the longitudinal direction of the upper case 13. The moveable member 80 and the first lever 72 are connected to the rotating lever 83 to move forward and rearward.

The upper case 13 has a linear guide hole 80a formed in the upper front side thereof facing the movable member 80, and a movable pin 81 is inserted into the linear guide hole 80a to guide the forward and rearward movement of the movable member 80.

The power transmitting member 90 includes a pinion gear 92 engaged with the rack gear 84 of the movable member 80 to move a first lever 72 and the movable member 80, and a loading motor 94 for rotating the pinion gear 92.

When the rack gear 84 of the movable member 80 is engaged with the pinion gear 92, the first lever 72 is moved to the front side of the optical disc player 1 and the second lever 74 is moved to the rear side of the optical disc player 1 so that the turntable positioned below the optical disc is lifted to the chucking position by the first and second levers 72 and 74 of the chucking lever 70.

Figure 9A:
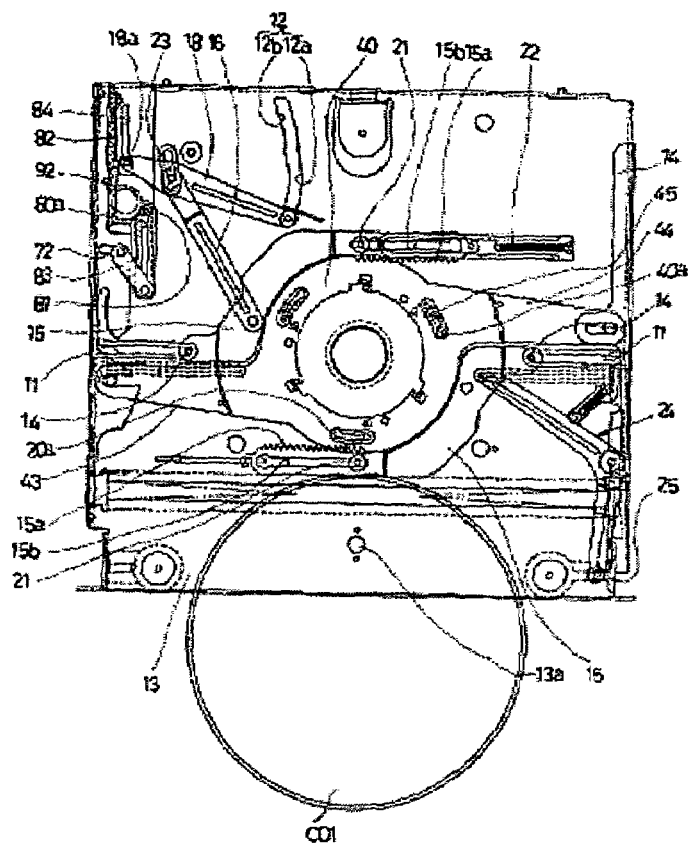
FIGS. 9a and 9b are plan views illustrating the loaded state of an 8 cm optical disc.
Figure 9B:
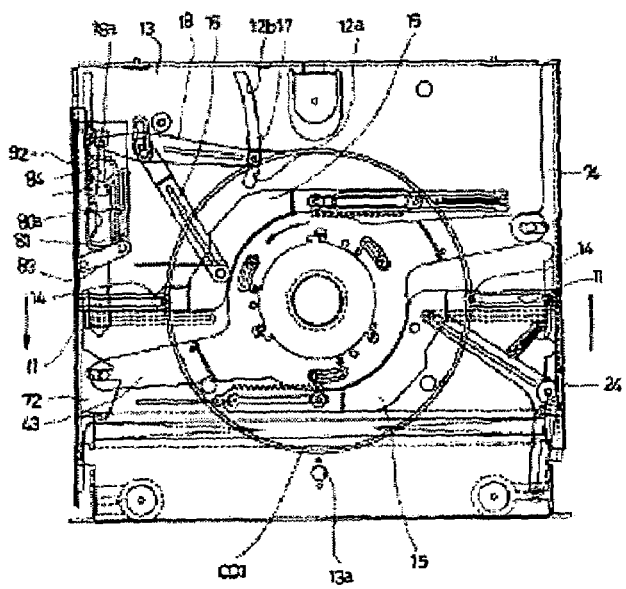

The disc determining device of the optical disc player according to the preferred embodiment of the present invention will now be described. As shown in FIGS. 9a and 9b, when the 8 cm optical disc CD1 is inserted into the optical disc player 1, the sensing light beam, projected from a photo-sensor (not shown) through the sensor hole 13a, is blocked by the optical disc CD1 and an insertion signal of the optical disc CD1 is generated.

At the same time, the loading motor 94 of the disc chucking lever device A is driven by the insertion signal such that the roller 13b is driven to load the optical disc CD1 into the optical disc player 1 so that the optical disc CD1 is inserted into the optical disc player 1 by the roller 13b.

When the optical disc CD1 deviates from the loading position and is shifted to one side so that the optical disc CD1 contacts only one of the first pins 14 protruded from the lower side of the optical disc player 1 though the linear guide holes 11, since the first pins 14 contacting the optical disc CD1 are respectively locked in the inner sides of the linear guide holes 11 by the locking member 24, disposed in the region of the horizontally movable levers 15 in the front side of the upper case 13 (See FIG. 9a), the optical disc CD1 contacting the first pins 14 is not escaped from the linear guide holes 11 but is guided to the chucking plate 30 disposed in the central region by the first pins 14 when the optical disc CD1 contacts one of the first pins 14.

As such, when guiding the optical disc CD1 to precisely mate the optical disc CD1 to the chucking plate 30 by the first pins 14, when the inner portion of the optical disc CD1 contacts the second pin 17, positioned at the end of the first arc-shaped hole 12a of the duplicate arc-shaped guide hole 12 to push the second pin 17 to the outer side of the upper case 13 such that the center of the optical disc CD1 is aligned with the center of the chucking plate 30, the pivoting lever 18, connected to the second pin 17, is pivoted by the second pin 17 so that the disc chucking lever device A is driven.

In other words, when the connection pin 18a of the pivoting lever 18 is inserted into the guide locking hole 82 of the movable member 80, the movable member 80 is moved to the front side by the connection pin 18a. Then, the movable member 80 moves forward, and the rack gear 84 of the movable member 80 is engaged with the pinion gear 92 of the power transmitting member 90 being rotated and disposed at the lower side of the upper case 13 (See FIGS. 9b and 14 to 16).

At the same time, the movable pin 81 disposed at the rear side of the movable member 80 moves forward (towards the loaded optical disc) along the linear guide hole 80a formed in the upper case 13, and the guide locking hole 82 of the movable member 80 moves to the front side due to the guide of the connection pin 18a of the pivoting lever 18.

Figure 16:
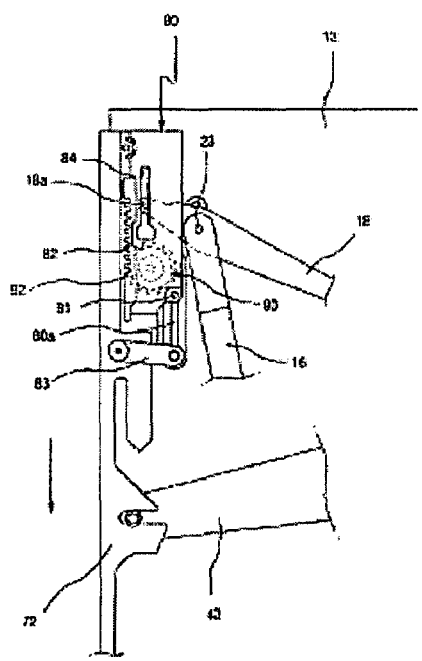
FIG. 16 is a view illustrating operation of the driving device of FIG. 15.
Figure 17A:
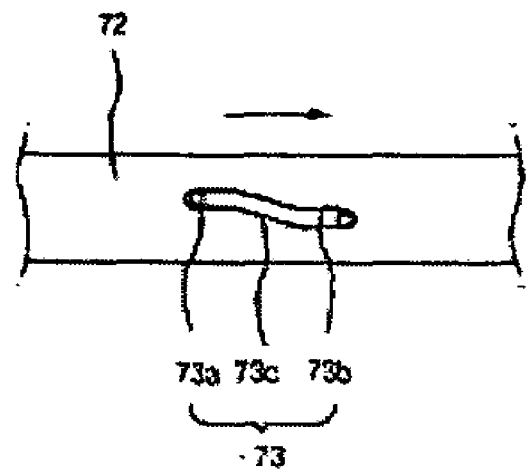
FIGS. 17a and 17b are views illustrating operation of a chucking lever of the driving device of the disc determining device and the disc chucking device of the optical disc player according to the preferred embodiment of the present invention.
Figure 17B:
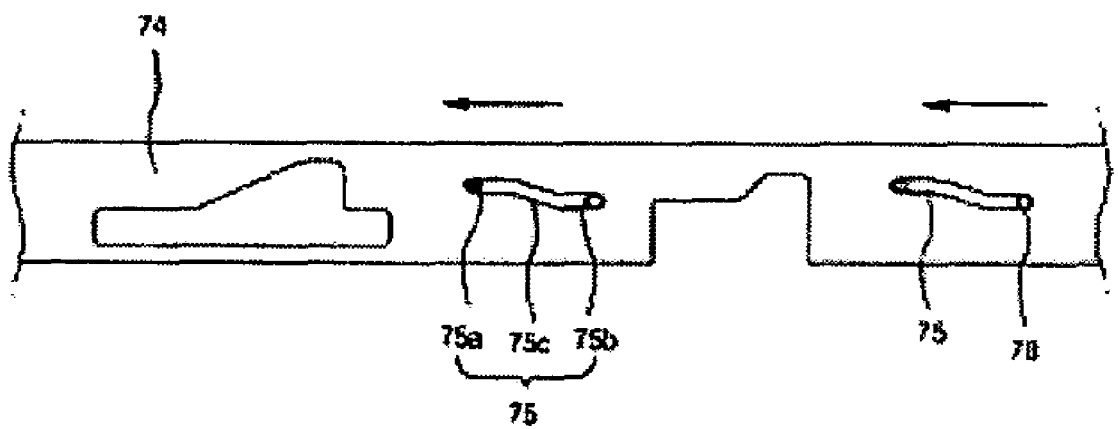

At that time, the movable member 80 is seated at the same level as that of the first lever 72 in the longitudinal direction of the upper case 13, and the movable member 80 and the first lever 18 connected by the pivoting lever 83 move forward together (See FIG. 16).

As such, since, when the rack gear 84 of the movable member 80 is engaged with the pinion gear 92, the rack gear 84 moves to the front side of the optical disc player 1 along the pinion gear 92, the movable member 80 and the first lever 72 move forward, and the rotation holes 40a of the chucking plate holder 40 connected to the first lever 72 rotate counterclockwise about the pin members 45 disposed in the upper case 13.

As such, the blade 43 of the chucking plate holder 40 pivots counterclockwise and the second lever 74 connected to the blade 44 of the chucking plate holder 40 pivots in the direction opposite to the pivoting direction of the first lever 72, i.e. clockwise, so that the turntable 6 connected to the first lever 72 of the chucking lever 70 chucks the optical disc and is lifted to the pickup position, whereby information is read by the pickup device.

Meanwhile, the first and second levers 72 and 74 respectively have the distance maintaining slots 73 and 75, and the movable pins 78 protruded from the ends of the pickup case 3 are respectively inserted into the distance maintaining slots 73 and 75 so that the distance maintaining slots 73 and 75 of the first and second levers 72 and 74 move along the movable pins 78 forward and backward.

The distance maintaining slots 73 and 75 have the upper and lower horizontally seating parts 73*a*, 73*b*, 75*a*, and 75*b* on which the movable pins 78 are seated, and the slopes 73*c* and 75*c* for connecting the upper and lower horizontally seating parts 73*a*, 73*b*, 75*a*, and 75*b*. The first and second levers 72 and 74 move forward and backward as much as the lengths of the distance maintaining slots 73 and 75 and the heights of the slopes 73*c* and 75*c* (See FIGS. 17*a* and 17*b*).

Figure 10A:
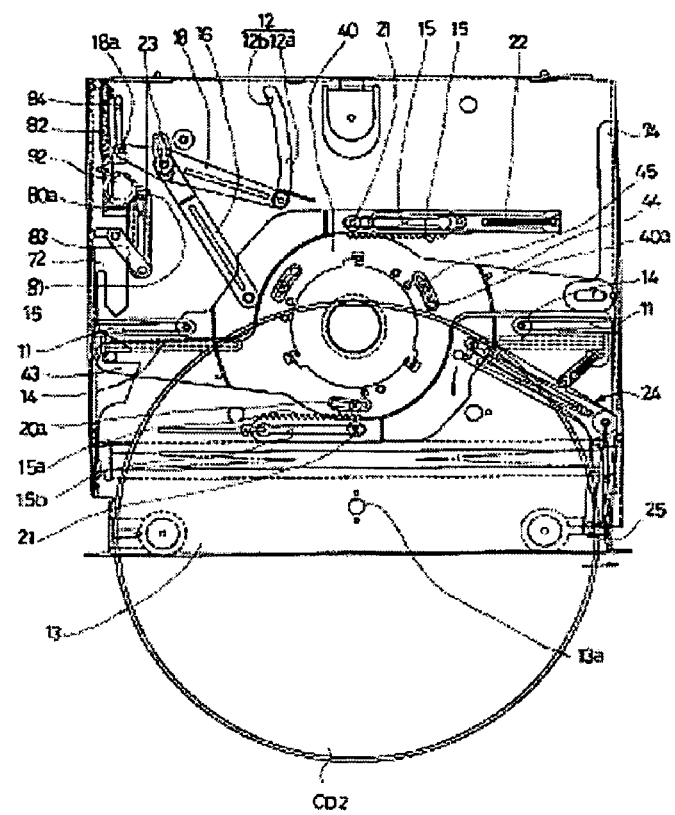
FIGS. 10a and 10b are plan views illustrating the loaded state of a 12 cm optical disc.
Figure 10B:
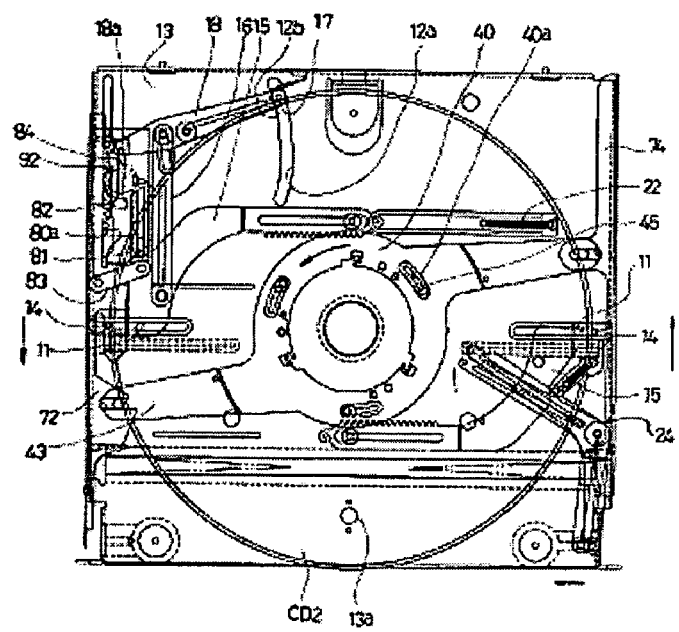

Meanwhile, as shown in FIGS. 10*a* and 10*b*, when the 12 cm optical disc CD2 is inserted into the optical disc player 1, the optical disc CD2 is locked by the rotation roller 27 of the locking member 20 so that the fixing pin 25*a* disposed at the side of the rotating piece 26 moves along the locking and moving hole 25 to the right side, whereby the locking step 26*a* of the other side of the rotating piece 26 rotates counterclockwise about the rotation pin 24*b* and the locking step 26*a* is separated from the lower sides of the horizontally movable levers 15 so that the horizontally movable levers 15 are released. At that time, the elastic member 28 disposed between the other end of the rotating piece 26 and the upper case 13 is lengthened (See FIG. 8).

In this state, a pair of the first pins 14 disposed at the inner side of the linear guide holes contacts the optical disc CD2 such that the first pins 14 move along the linear guide holes 11 to the outer side by the continuously moving optical dim CD2.

Thus, when the linear gear 15*a* of the horizontally movable levers 15, in which the first pins 14 are installed, is engaged with the gear 20*a* of the rotation plate 20 rotatably connected to the lower side of the chucking plate holder 40 by the first pin 14, the linear guide holes 15*b* of the horizontally movable levers 15 move to the outer side along the pin members 21.

At that time, the linear gear 15*a* of one of the horizontally movable levers 15 is engaged with the gear 20*a* of the rotation plate 20 due to the elastic force of the tension spring 22.

As such, the connection linkage 16, connected to one of the horizontally movable levers 15 moving to the outer side, is pivoted about the connection position 23 and moves along the arc-shaped guide hole 12. Due to the movement of the connection linkage 16, the pivoting lever 18 connected to the connection linkage 16 via the connection position is pivoted as shown in FIG. 10*b* so that the second pin 17 moves to the second arc-shaped hole 12*b* of the duplicate arc-shaped guide hole 12.

At that time, when the center of the 12 cm optical disc CD2 is aligned with the center of the chucking plate 30, as described above, like the 8 cm optical disc CD1, the pivoting lever 18 connected to the second pin 17 is driven so as to drive the disc chucking lever device A such that the center of the optical disc CD2 is aligned with the center of the chucking plate 30, and the optical disc CD2 is chucked by the chucking device so that the pickup device (not shown) reads information from the optical disc CD2.

Meanwhile, as shown in FIG. 13*a*, without the optical disc, the chucking plate 30 is pressed toward the chucking plate holder 40 by the plural plate springs 60, installed to the lower side of the chucking plate holder 40, whose leading ends are inserted into the plural introducing grooves 54 formed in the central region of the upper case 13.

Each of the plate springs 60 includes the fixing part 61 fixed to the lower side of the chucking plate holder 40, the connector 62 integrally formed with the fixing part 61 and closely contacting the upper side of the introducing groove 54, the elastic part 63 integrally formed with the connector 62 at an angle and inserted into the upwardly curved protrusion 54*a* and the locking protrusion 54*b* of the introducing groove 54, and the seating part 64, integrally formed with the elastic part 63, on which the chucking plate 30 is seated when the end of the seating part 64 is positioned at the inner circumference of the opening 52. The number of the plate springs 60 is identical to the number of the introducing grooves 54.

In this state, when the loaded optical disc is positioned at the chucking position by the first and second levers 72 and 74 of the chucking lever 70, the chucking plate holder 40, connected to the first and second levers 72 and 74 by the blades 43 and 44, is rotated in the same direction as the first and second levers 72 and 74 due to the forward and backward movement of the first and second levers 72 and 74.

As such, when the elastic parts 63 of the plate spring 60 fixed to the lower side of the chucking plate holder 40 by the fixing part 61 are inserted into the upwardly curved protrusions 54*a* and the locking protrusions 54*b* of the introducing grooves 54, the elastic parts 63 pass between the upwardly curved protrusions 54*a* and the locking protrusions 54*b* to the side and move down to closely contact the lower sides of the introducing grooves 54. Simultaneously, the connectors 62 are inserted into the upwardly curved protrusions 54*a* and the locking protrusions 54*b*, and the seating parts 64 positioned in the introducing grooves 54 are spaced apart from the lower side of the opening 52 and move to the sides of the lower sides of the introducing grooves 54.

At that time, the plate springs 60 move to the side by the rotation distance of the chucking plate holder 40 and move to the lower side of the introducing grooves 54.

Thus, a predetermined space must be provided in the lower side of the chucking plate holder 40 for accommodating the chucking plate 30, and the chucking plate 30 can move down as long as the traveled distance of the plate springs 60 within the predetermined space.

At that time, the chucking plate holder 40 lowers the chucking plate 30. Simultaneously, the turntable disposed at the optical disc is lifted to the chucking position by the first and second levers 72 and 74 and the chucking plate 30 is introduced to the lower side due to the magnetic force of the magnet 7 installed to the turntable 6 so that the chucking part 31 disposed to the lower side of the chucking plate 30 closely contacts the optical disc.

Therefore, the optical disc is chucked by the chucking plate 30 and is rotated by the motor 8 installed to the lower side of the turntable 6.

Meanwhile, when ejecting the optical disc in the state of chucking the optical disc, the loading motor 94 is reversely rotated to reversely rotate the pinion gear 92, the rack gear 84 of the movable member 80 moves along the pinion gear 92 to the rear side of the optical disc player 1, such that the rack gear 84 is released from the pinion gear 92, the first lever 72 moves rearward, and the blades 43 and 44 of the chucking plate holder 40 connected to the first and second levers 72 and 74 are respectively pivoted clockwise and counterclockwise so that the plate springs 60 move to the other side as long as the rotation distance of the chucking plate holder 40 as described above.

In other words, the connectors of the plate springs 60 fixed to the lower side of the chucking plate holder 40 by the fixing parts 61 are inserted into between the upwardly curved protrusions 54a and the locking protrusions 54b and move to the other end to closely contact the lower side of the chucking plate holder 40, the elastic parts 63 move to the other side and are inserted in between the upwardly curved protrusions 54a and the locking protrusions 54b of the introducing grooves 54, the seating parts 64 spaced apart from the lower sides of the introducing grooves 54 by a proper distance move to the other side to closely contact the introducing grooves 54 at an angle, and the turntable 6 moves down.

Thus, the chucking plate 30 is pressed upward by the plate springs 60 such that the central protrusion 34 of the chucking plate 30 is inserted into the accommodating hole 42 formed in the chucking plate holder 40 so that the optical disc is released (See FIG. 13a).

As described above, according to the present invention, the disc determining device for determined the size (8 cm and 12 cm) of the optical disc loaded into the optical disc player is guided to the chucking position by the pins and members for locking the pins and positions of the pins for driving the chucking device are changed according to the size of the optical disc so that the optical disc player can be slim. Since the chucking plate, the chucking plate holder, and the plate springs of the disc chucking device for horizontally chucking the optical disc inserted into the optical disc player are thin, the optical disc player can be slim.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical disc player comprising:
    a disc determining device for determining the size of an optical disc loaded into the optical disc player;
    a disc chucking device for chucking the optical disc loaded into the optical disc player; and
    a disc chucking lever device for associating the disc determining device with the disc chucking device,
    wherein the disc determining device comprises: a pair of linear guide holes symmetrically formed in the central region of an upper case;
    horizontally movable levers movably inserted into the linear guide holes by first pins and having linear gears engaged with gears of a rotation plate;
    a locking member disposed in the region of the horizontally movable levers of the front side of the upper case to lock the first pins of the horizontally movable levers in the linear guide holes; and
    a pivoting lever connected to one of the horizontally movable levers by a connection linkage, and having a second pin contacting the optical disc when the optical disc is positioned at the chucking position and driving the disc chucking lever device when the second pin is positioned at a proper position by the optical disc.

2. The optical disc player as set forth in claim 1, wherein the distance between the linear guide holes is maintained to at least 8 cm.

3. The optical disc player as set forth in claim 1, wherein linear guide holes are formed adjacent to the linear gears of the horizontally movable levers and pin members installed to the upper case are movably inserted into the guide holes so that the horizontally movable levers are guided to move right and left.

4. The optical disc player as set forth in claim 1, wherein the second pin is selectively moved along a guide hole having first and second arc-shaped holes according to the size of the loaded optical disc to drive the disc chucking lever device.

5. The optical disc player as set forth in claim 1, wherein the locking member comprises:
    a locking and moving hole formed in the front side of the upper case; a rotating piece having an end movably inserted into the locking and moving hole by a fixing pin, a central region rotatably connected to the upper case by a rotation pin, and the other end having a locking step to which the lower sides of the horizontally movable levers are locked;
    a rotation roller rotatably hung around the outer circumference of the fixing pin to contact the 12 cm optical disc and to rotate the rotating piece when the 12 cm optical disc passes therethrough; and
    an elastic member disposed between the other end of the rotating piece and the upper case to support the rotating piece.

6. The optical disc player as set forth in claim 1, wherein the disc chucking device comprises:
    a chucking plate holder rotatably connected to the upper case and having a pair of blades connected to the disc chucking lever device;
    a plurality of plate springs disposed to the chucking plate holder;
    introduction grooves formed in the inner circumference of an opening formed in the central region of the upper case, and having upwardly curved protrusions integrally and upwardly formed with the inner sides of an opening introducing grooves and locking protrusions formed in the other sides of the introducing grooves and spaced apart from the upwardly curved protrusions by a predetermined distance, wherein the plate springs are selectively introduced therein when the optical disc is chucked or released; and
    a chucking plate accommodated on the upper sides of the plate springs to be elastically pressed upward.

7. The optical disc player as set forth in claim 6, wherein each of the plate springs comprises:
    a fixing part fixed to the lower side of the chucking plate holder;
    a connector integrally formed with the fixing part;
    an elastic part integrally formed with the connector at an angle and inserted in between the upwardly curved protrusion and the locking protrusion of the introducing groove; and
    a seating part, integrally formed with the elastic part, on which the chucking plate is seated.

8. The optical disc player as set forth in claim 6, wherein the chucking plate takes the form of a disc and comprises:
    an outer circumference to which elastic force of the plural plate springs is applied;
    a chucking part positioned in the outer circumference and protruded above the plate springs to contact the upper side of the optical disc when chucking the optical disc; and
    a central protrusion accommodated in an accommodating hole of the chucking plate holder by the elastic force of the plate springs when the optical disc is not chucked.

9. The optical disc player as set forth in claim 6, wherein the disc chucking lever device comprises:
- a chucking lever including first and second levers connected to blades of the chucking plate holder and respectively installed to the sides of the upper case to move in opposite directions;
- a movable member including a guide locking hole connected to the other end of a pivoting lever by a connection pin and a rack gear formed in the inner side of the guide locking hole, and movably seated on the upper side end of the upper case at the same level as that of the first lever; and
- a power transmitting member installed to the lower side of the upper case and including a pinion gear engaged with the rack gear, and a loading motor for rotating the pinion gear.

10. The optical disc player as set forth in claim 9, wherein the first and second levers respectively include distance maintaining slots having upper and lower horizontally seating parts, and slopes for connecting the upper and lower horizontally seating parts, wherein movable pins, protruded from the ends of a pickup case are respectively inserted into the distance maintaining slots so that the distance maintaining slots move along the movable pins forward and rearward.

* * * * *